(12) United States Patent
Cohen et al.

(10) Patent No.: US 11,636,509 B2
(45) Date of Patent: Apr. 25, 2023

(54) SELF-OPTIMIZING, MULTI-CHANNEL, COGNITIVE DIGITAL HEALTH AND LIFE INSURANCE RATE QUOTING, COMPARISON SHOPPING AND ENROLLMENT SYSTEM AND METHOD

(71) Applicant: PATTY, LLC, Deerfield Beach, FL (US)

(72) Inventors: Seth Cohen, Lighthouse, FL (US); Luis Silvestre, Miramar, FL (US)

(73) Assignee: Patty, LLC, Deerfield Beach, FL (US)

(*) Notice: Subject to any disclaimer, the term of this patent is extended or adjusted under 35 U.S.C. 154(b) by 0 days.

(21) Appl. No.: 16/945,294

(22) Filed: Jul. 31, 2020

(65) Prior Publication Data

US 2021/0035153 A1 Feb. 4, 2021

Related U.S. Application Data

(60) Provisional application No. 62/891,777, filed on Aug. 26, 2019, provisional application No. 62/887,962, (Continued)

(51) Int. Cl.
| | | |
|---|---|---|
| *G06Q 30/02* | (2023.01) | |
| *G06Q 30/0242* | (2023.01) | |
| *G06N 5/043* | (2023.01) | |
| *G06Q 10/10* | (2023.01) | |
| *G06Q 40/08* | (2012.01) | |

(Continued)

(52) U.S. Cl.
CPC ......... *G06Q 30/0244* (2013.01); *G06F 3/167* (2013.01); *G06F 9/453* (2018.02); *G06F 16/9535* (2019.01); *G06N 5/043* (2013.01); *G06Q 10/10* (2013.01); *G06Q 30/0203* (2013.01); *G06Q 30/0246* (2013.01);
(Continued)

(58) Field of Classification Search
CPC ........... G06Q 30/0244; G06Q 30/0203; G06Q 30/0246; G06F 9/453; G06F 16/9535
See application file for complete search history.

(56) References Cited

U.S. PATENT DOCUMENTS 8,346,563 B1 * 1/2013 Hjelm ................. G10L 15/1822
704/275
8,422,693 B1 * 4/2013 Daily ................. G01C 21/3629
381/86

(Continued)

FOREIGN PATENT DOCUMENTS

| KR | 20190051904 | 5/2019 |
|---|---|---|
| KR | 20190065840 | 6/2019 |
| WO | 20190048941 A1 | 3/2019 |

OTHER PUBLICATIONS

International Search Report, PCT/US2020/044725, dated Oct. 13, 2020.

*Primary Examiner* — Scott C Anderson
(74) *Attorney, Agent, or Firm* — Porzio Bromberg & Newman P.C.

(57) ABSTRACT

A performance internet marketing self-optimizing, anthropomorphic, artificial intelligence-based system and method to quote, compare and purchase benefits products from a benefits provider. The system and method collects information from an online advertising platform during the process and returns the collected information to the online advertising platform for optimization of the online advertising platform.

9 Claims, 5 Drawing Sheets

10

11 - User enters search terms in online optimized advertising platform

12 - If entered search terms match to system pre-defined search terms, optimized online advertising platform displays link to connect with cognitive virtual assistant

Related U.S. Application Data filed on Aug. 16, 2019, provisional application No. 62/886,393, filed on Aug. 14, 2019, provisional application No. 62/881,706, filed on Aug. 1, 2019.

(51) Int. Cl.

| | |
|---|---|
| *G06Q 30/0251* | (2023.01) |
| *G06F 3/16* | (2006.01) |
| *G06Q 30/0203* | (2023.01) |
| *G06F 9/451* | (2018.01) |
| *G06F 16/9535* | (2019.01) |
| *G10L 15/22* | (2006.01) |

(52) U.S. Cl.
CPC ..... *G06Q 30/0256* (2013.01); *G06Q 30/0269* (2013.01); *G06Q 40/08* (2013.01); *G10L 15/22* (2013.01)

(56) References Cited

U.S. PATENT DOCUMENTS

| | | | |
|---|---|---|---|
| 8,793,147 B2 | 7/2014 | Bradshaw et al. | |
| 9,495,700 B2 | 11/2016 | Hoch et al. | |
| 9,812,151 B1 | 11/2017 | Amini et al. | |
| 9,996,881 B2 | 6/2018 | Mdeway | |
| 10,276,170 B2* | 4/2019 | Gruber | G06F 16/9537 |
| 10,659,585 B1* | 5/2020 | Graham | H04M 3/493 |
| 2002/0120554 A1 | 8/2002 | Vega | |
| 2003/0093302 A1* | 5/2003 | Quido | G06Q 40/08 |
| | | | 705/4 |
| 2007/0078700 A1 | 4/2007 | Lenzmann | |
| 2007/0094072 A1 | 4/2007 | Vidals | |
| 2010/0070307 A1 | 3/2010 | Sinvhal-Sharma | |
| 2017/0161758 A1 | 6/2017 | Towriss | |
| 2018/0025010 A1* | 1/2018 | Ramer | H04N 21/251 |
| | | | 707/727 |
| 2019/0035040 A1 | 1/2019 | Goel | |
| 2019/0171351 A1 | 6/2019 | Kilchenko et al. | |

* cited by examiner

SELF-OPTIMIZING, MULTI-CHANNEL, COGNITIVE DIGITAL HEALTH AND LIFE INSURANCE RATE QUOTING, COMPARISON SHOPPING AND ENROLLMENT SYSTEM AND METHOD

BACKGROUND OF THE INVENTION

Field of the Invention

The present invention relates to a performance internet marketing self-optimizing, anthropomorphic, artificial intelligence-based system and method to quote, compare and purchase life and health insurance, or benefits products and services (hereinafter "benefits products") from an insurance benefits provider, benefits company, healthcare discount plan provider, health care sharing ministry, or similar entities (hereinafter "benefits provider(s)") through a cognitive virtual process via phone, mobile device, tablet, app, SMS, chat, iMessage, videoconference, or virtual reality (hereinafter "method(s) of communication").

Description of the Related Art

Consumers of benefits products commonly use comparison shopping internet websites to research and compare available options. Benefits products comparison shopping websites attempt to guide consumers through intricate product variations from multiple benefits providers. The consumer often struggles to identify adequate affordable coverage and plan options in the marketplace due to a disarray of benefits products ranging from various types (on-exchange, off-exchange, limited indemnity medical, short term medical, ministry, cost sharing), levels of coverage (Platinum, Gold, Silver, Bronze at the federal level), premiums, co-pays, membership fees, deductibles, and limitations. A state of asymmetric information for products across the individual marketplace exists and potentially leads the consumer to adverse selection.

Due to the nature of the chaotic environment, the individual marketplace is also an outlet for fraudulent benefits products. In many cases, consumers seek the assistance of a licensed insurance agent, producer or broker (hereinafter "agent") to select a benefits product. It is common in the individual marketplace for a consumer to speak with an agent by phone to review available Benefits product options and complete the benefits provider's enrollment process. The agent typically enters the consumer's underwriting details into a rate quoting calculator or web form to obtain rates, explains the differences between plan options from various benefits providers, and transcribes the enrollment details onto the benefits provider's application or enrollment portal on behalf of the consumer.

In many cases, the agent is appointed to represent a limited number of benefits providers thus limiting the consumer's choices to only plans offered by those benefits providers. Compensation arrangements for insurance agents also typically include commissions (a percentage of premium as paid by the benefits provider) or another form of compensation (e.g., marketing fees). Agent bias, thus, is also potentially a significant factor in adverse selection.

Conventional systems have been used for extracting user data to identify available insurance plans based on responses from the consumer. U.S. Pat. No. 9,495,700 describes the use of branded virtual characters on a server computer which are accessed by an employee at a remote client computer over a network in order to engage and educate users regarding alternate benefit plans. Throughout the process, the system employs a portfolio-driven approach to identify inter-dependencies among different benefit products and plans and prioritize and recommend "portfolio-level" benefit solutions. The employee can be automatically enrolled in the selected benefit plan. This system has the drawback of needing a computer interface to access the system over the internet and can be cumbersome for a person to navigate, especially the elderly or unsophisticated computer users.

It is desirable to provide an unbiased, anthropomorphic, artificial intelligence-based telephonic system and method to identify the consumer's available benefits product options based on eligibility, assist in the comparison of different options, automatically enroll the consumer into selected plans available from various insurers, and self-optimize the online performance marketing campaign for referring the consumer to the system.

SUMMARY OF THE INVENTION

The present invention relates to an anthropomorphic, artificial intelligence-based system to optimize real-time marketing spend using historical performance data and real time buying signals and to drive consumers to the action of quoting, comparing, and purchasing benefits products in real time. The process of real time optimization can use an application programming interface ("API") to relay critical performance metrics from a cognitive virtual assistant to online advertising platforms. The online advertising platforms can be search engines, such as for example, Google Adwords, Microsoft Bing, & Yahoo Gemini. Search engines are online advertising platforms that offer advertisers the ability to purchase an ad listing which prompts the consumer to visit a website or call a phone number if the consumer types a specified search query. In addition, real-time optimization of referring search marketing campaigns occurs via API by relaying critical performance metrics from the cognitive virtual assistant to an online third-party search engine or lead aggregator bidding platforms. In one embodiment, the online bidding platform uses a ping post method to allow a lead seller to send partial information, the "ping", of a lead to their network of lead buyers. The buyer then determines whether he or she would like to purchase the lead based on this information and obtains contact information from the seller via the "post."

Search engines often display multiple advertisers' ads for the same search query and give full control to the advertiser over the search queries they choose to display their ads on. The ad position for each unique search query is determined primarily by a maximum cost-per-click ("CPC") which dictates the highest amount that an advertiser is willing to spend for a click on a website advertisement or a phone call. In addition to specifying a max CPC for each keyword query, the advertiser is also given tools to increase or decrease their max CPC based upon demographics of the consumer, such as for example gender, age, household income, parental status, and location along with environmental factors, such as for example time of day and day of week. Every unique ad listing a search engine displays to a consumer takes the above factors into consideration to determine a final ad position.

In the present invention, if the consumer chooses to click through via an ad listing of the advertiser, a click tracking identification (ID) is generated by the search engine which is unique to the consumer's click. The click tracking ID can be linked back to the consumer whether they choose to complete an insurance application online or call in from the website and complete an application over the phone.

In the present invention, the process of optimization can use an API from the cognitive virtual assistant to deliver a status of the application back to the search engine using a status tracking ID generated by the search engine. By delivering the performance data, such as for example successful applications, from the cognitive virtual assistant to the search engine, real time performance of each unique keyword query on an application level can be determined along with performance factors, such as gender, age, household income, parental status, and location, along with environmental factors, such as time of day and day of the week. The system can make real time, automatic optimization using the search engines' API to control max CPC and demographic-specific bids based upon current application performance to, in turn, optimize marketing spend and drive future applications automatically.

The user (a buyer, consumer, or system herein referred to as "user") initiates a session via various methods of communication. In one embodiment, a session is initiated by a user using one of the selected methods of communication. For voice sessions, audio interfaces of the system allow multi-language bidirectional speech-based conversations between the cognitive virtual assistant and the user. As the user speaks to the cognitive assistant, the process of automated speech recognition (ASR) digitally converts audible speech into transcribed text. Through natural language processing, including sentiment and tone analysis, the system evaluates the meaning and context of the transcribed text and adjusts the language and tone of the cognitive virtual assistant's responses accordingly to accommodate the user. Context-switching capability of the system allows the user to interrupt and restart any embedded process while retaining the user's information. The system can include anepisodic memory to allow the cognitive virtual assistant to recall details from previous segments of the current conversation or previous conversations altogether. The cognitive virtual assistant can be implemented in a conversational manner for receiving information from a user and generating responses using cognitive learning abilities during the conversation. The cognitive learning abilities of the cognitive virtual assistant can also include analytic memory for understanding trend of data, affective memory for understanding emotion and deep back projection networks ("DBPN") for learning process flows via empirical learning. The cognitive virtual assistant can be considered to be a "trusted" virtual producer for the user as compared to a human motivated to make any sale.

Once a session is initiated, the user is introduced to the cognitive virtual assistant trained to generate rate quotes, compare available options, and enroll the consumer into selected plans available from various insurers. The cognitive virtual assistant follows a roadmap embedded in a semantic memory for guiding the user through the session. It allows the cognitive virtual assistant to engage in conversation with the user while restricting the conversation to insurance rate quoting, comparison shopping and enrollment topics and processes. In some embodiments, the user can be referred to the cognitive virtual assistant by an internet search engine, social media ad, or other internet-based performance marketing platforms. The cognitive virtual assistant captures the user's referral metadata including referring website URL, search phrase or ad clicked, geolocation, internet protocol ("IP") address, and other values for analytics and optimization.

In one embodiment, once a session is initiated, the user is introduced to a cognitive virtual assistant trained to generate rate quotes, compare available benefits products options, and enroll the consumer into selected plans available from various insurers. The cognitive virtual assistant follows a roadmap embedded in the system's semantic memory for guiding the user through the session. It allows the virtual assistant to engage in conversation with the user while restricting the conversation to insurance rate quoting, comparison shopping and enrollment topics and processes.

The cognitive virtual assistant can prompt the user to answer a series of pre-qualifying questions to determine available benefits product options. In one embodiment in order to generate a quote to list rates and details for benefits product options for one proposed insured, the cognitive virtual assistant can request the following information from the user: date of birth, zip code and gender. Responses from the user are stored in memory of the system. The system can invoke an API to call to one or more benefits provider's rate quoting servers to obtain available options from insurers for the quoted insured. Responses from the one or more rate quoting servers can contain rate quoting details, including, for example, plan descriptions, premiums and limitations. The cognitive virtual assistant can review the received responses and relay the received responses or a subset of the received responses to the user via the various methods of communication, at the user's preference. The system can utilize underwriting guidelines from insurers together with user stated preferences, eligibility and affordability to sort and highlight recommended options to the user.

The user can select one or more plans from the benefits product options and proceed to enrollment. The one or more options can be selected by specifying the one or more option names or one or more unique identifiers to the cognitive virtual assistant. Once the one or more options are selected, the system can invoke an API call to one or more third-party benefits provider's application servers to obtain application requirements for the selected benefits product options. The cognitive virtual assistant prompts the user to provide information directed to the application requirements for the selected benefits product option. Responses from the user can be stored in memory while collecting information from the user for each data field required on the application for the selected option. Upon satisfaction of the application requirements for the selected options, the system invokes an API call to one or more third-party benefits provider's enrollment servers corresponding to the one or more third party benefits provider's application servers to submit the application and obtain a policy or benefits plan identification (ID). It will be appreciated that in some embodiments the third-party benefits provider's application server can be the same server as the third-party benefits provider's enrollment server. The response from the third-party enrollment server can contain additional fulfillment material from the benefits provider for the user to be insured. The system can relay the additional fulfillment material to the user by various methods of communication, at the user's preference. The cognitive virtual assistant can also present cross-sell opportunities to the user.

In one embodiment, upon completion of the enrollment process, the system invokes an API call to a referring third-party internet marketing ad campaign server to report conversion details for the originating search phrase or ad clicked. The system periodically calculates ad-level conversion metrics and initiates an automated audience selection ("AAS") process. The AAS process calibrates an associated marketing campaign's scheduled geographic exposure and spending parameters via the API to regulate traffic and conversion cost. The system can provide security of the user interface and transmitted data. In one embodiment, data encryption can be used during transport of data.

The invention will be more fully described by reference to the following drawings.

DETAILED DESCRIPTION

Figure 1A:
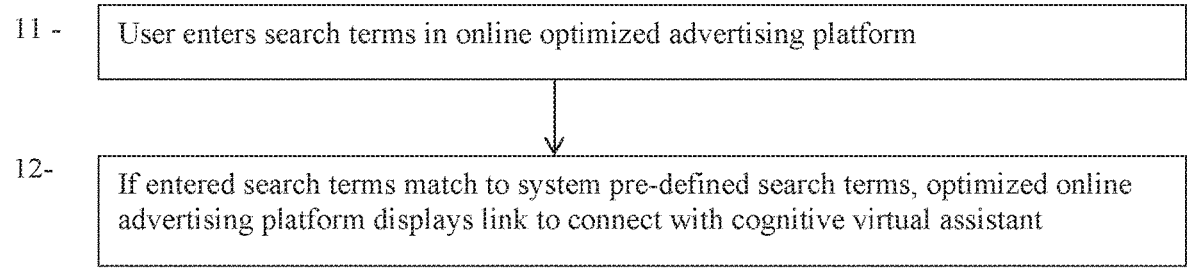
FIGS. 1A-1D are flow diagrams of one embodiment of a method for pre-qualifying a consumer, interactively collecting information for optimization of online advertising platforms and presenting relevant benefits product options based on eligibility to the user, presenting the user with a selection of determined benefits product options, and enrolling a qualified consumer in the user's selected benefits product option(s) as performed by a system of the present invention.
Figure 1B:
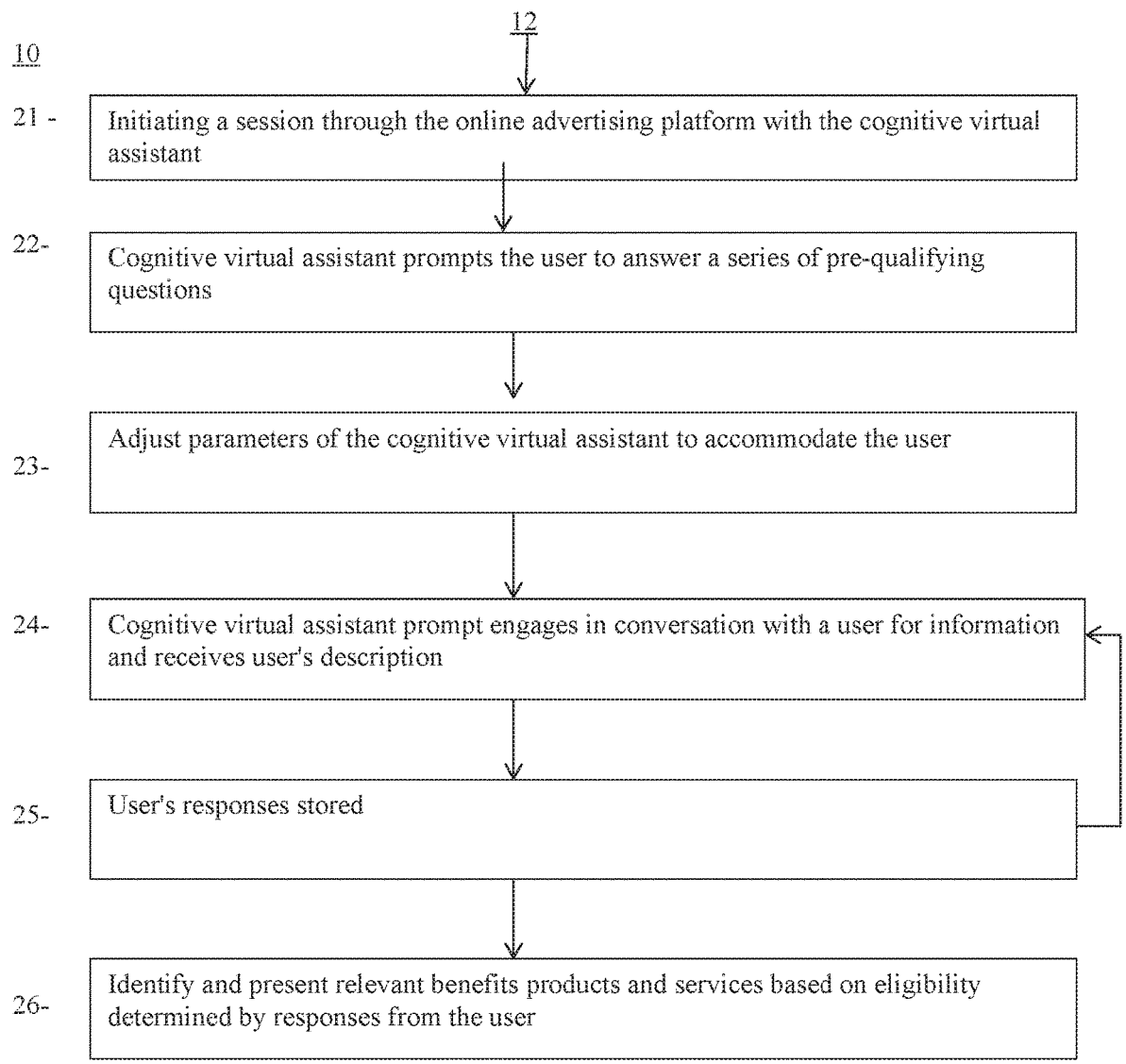
Figure 1C:
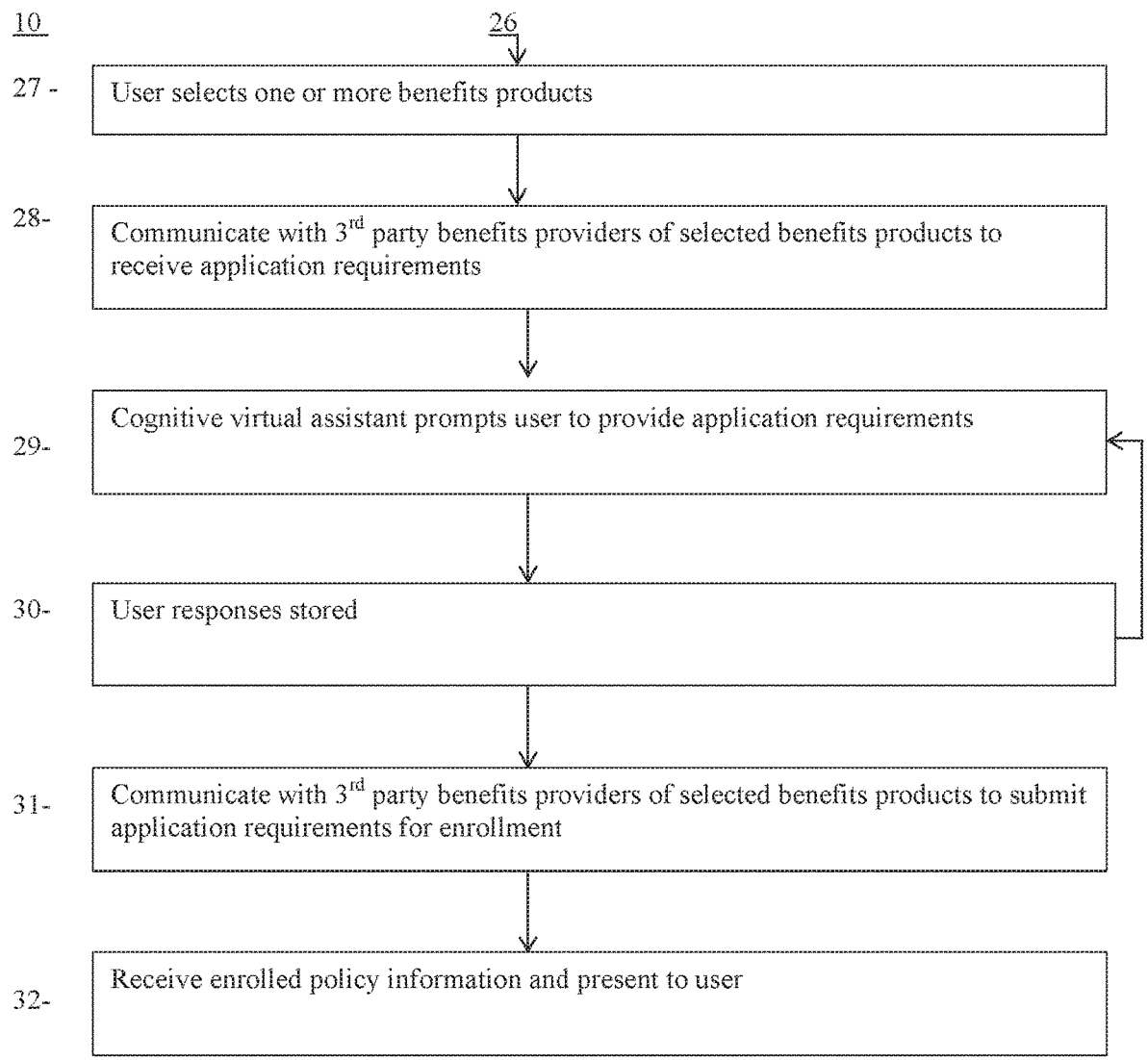
Figure 1D:
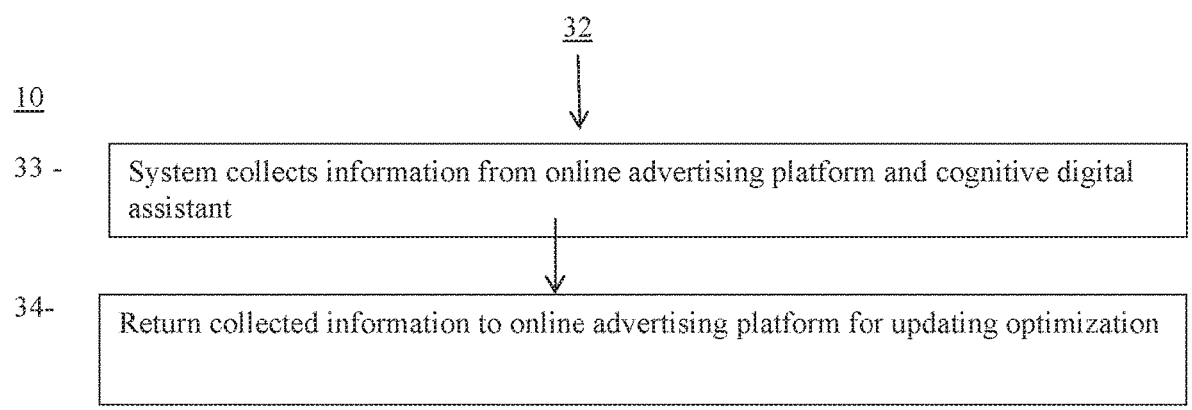

Reference will now be made in greater detail to a preferred embodiment of the invention, an example of which is illustrated in the accompanying drawings. Wherever possible, the same reference numerals will be used throughout the drawings and the description to refer to the same or like parts.

As used in this application, the terms "component", module," "system," "interface," or the like are generally intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. As another example, an interface can include I/O components as well as associated processor, application, and/or API components.

FIGS. 1A-1D are flow diagrams of an embodiment of interactive method 10 for interactively collecting information for optimization of online advertising platforms, presenting one or more relevant benefits product options based on eligibility to the user, and enrolling of the user with determined benefits product options.

In step 11, a user enters one or more search terms in an optimized online advertising platform. The optimized online advertising platform can be a search engine, such as for example, Google Adwords, Microsoft Bing, & Yahoo Gemini. Alternatively, the optimized online advertising platform can include online third-party lead aggregator bidding platform. The online advertising platform can be optimized using historical performance data and real time performance metrics collected from the user with a cognitive virtual assistant as discussed below.

In step 12, if the one or more entered search terms match system pre-defined search terms the optimized online advertising platform displays a link to connect with a cognitive virtual assistant. The pre-defined search terms can relate to search phrases for benefits products, such as for example "affordable health insurance." An example link to connect to the cognitive virtual assistant can be in the form of establishing a telephone call with the cognitive virtual assistant. Alternatively, the link can be an associated number of the cognitive virtual assistant which can be used by the user to establish a call with the cognitive virtual assistant.

In step 21, a session with a cognitive virtual assistant is initiated from the link provided by the online advertising platform. The user can be a buyer or consumer or system. For example, the user can initiate the session with the system using an interface of various methods of communication. Once a session is initiated, in step 21, the user is introduced to a cognitive virtual assistant. The cognitive virtual assistant can greet and prompt the user to answer a series of pre-qualifying questions in step 22. In one embodiment, the system can internalize the user's answers and not repeat questions which limits buyer or consumer frustration. For a voice session, audio interfaces of the system allow multi-language bidirectional speech-based conversations between the cognitive virtual assistant and the user. As the user speaks to the cognitive virtual assistant, a process of automated speech recognition ("ASR") can digitally convert received audible speech into transcribed text. Through natural language processing, including sentiment and tone analysis, the system evaluates the meaning and context of the transcribed text and adjusts the language and tone of responses from the cognitive virtual assistant accordingly to accommodate the user. The context-switching capability of the system allows the user to interrupt and restart any embedded process while retaining the user's information. The system's episodic memory allows the assistant to recall details from previous segments of the current conversation or previous conversations altogether. The cognitive virtual assistant can be implemented in a conversational manner for receiving information from a user and generating responses using cognitive learning abilities during the conversation. In one embodiment, the cognitive virtual assistant presents audio to the user and receives audio from the user. The cognitive virtual assistant is able to receive voice responses via an audio interface which is transferred to a server to be interpreted with artificial intelligence in real time. Responses from the server can be sent back via audio to the user's audio interface In step 23, during the session between the user and the cognitive virtual assistant, the system can adjust parameters of the cognitive virtual assistant to accommodate the user. For example, language and tone of the cognitive virtual assistant can be selected or adjusted. The cognitive virtual assistant can utilize commercial technologies including for example sentiment analysis, tone analyzer and personality insights to adjust parameters of the cognitive virtual assistant.

In step 24, the cognitive virtual assistant engages in conversation to prompt the user to provide information and describe the benefits product options which are of interest to the user for purchase. In one embodiment, the cognitive virtual assistant can request the following information from the user: date of birth, zip code and gender. In step 25, responses from the user are stored in memory of the system. Step 24 and step 25 can be repeated for collecting additional information from the user directed to desired options.

In step 26, relevant one or more benefits products of one or more third-party benefits providers are identified to the user through the cognitive virtual assistant based on eligibility determined by responses from the user to the cognitive virtual assistant. In one embodiment, the system can invoke an API to call to one or more third-party insurance rate quoting servers to obtain available options from third-party benefits providers for the quoted insured. Responses from the one or more benefits provider's rate quoting servers can contain rate quoting details, including, for example, plan descriptions, premiums and limitations. The cognitive virtual assistant can review the received responses and present the received responses or a subset of the received responses to the user by various methods of communication, at the user's preference. The system can utilize underwriting guidelines from benefits providers together with user stated preferences, eligibility and affordability to sort and highlight recommended options to the user.

In step 27, the user can select one or more options of benefits products. The benefits products can include one or more plans which can be selected by the user specifying one or more plan names or one or more unique identifiers to the cognitive virtual assistant.

In step 28, the system can communicate with one or more third-party benefits providers of one or more selected benefits products to receive application requirements. In one embodiment, the system can invoke an API call to an application server of the one or more third-party benefits Providers to obtain application requirements for the selected options.

In step 29, the cognitive virtual assistant prompts the user to provide information directed to the application requirements for the selected option. In step 30, responses from the user can be stored in memory. Step 29 and step 30 can be repeated for collecting information from the user for each data field required on the application for the selected option. The system can review the collected information to ensure that application requirements for the selected options are satisfied. If the application requirements are not satisfied, steps 29 and 30 can be repeated.

In step 31, the system communicates with one or more third party benefits providers of selected benefits products to submit application requirements for enrollment. In one embodiment, the system invokes an API call to an enrollment server of the one or more third-party benefits providers corresponding to an application server of the selected one or more third-party benefits providers to submit the application and obtain a policy or plan ID. In one embodiment, the virtual assistant automatically transfers the user to the selected benefits provider for enrollment. In step 32, the system can receive enrolled policy or plan information and presents the received information to the user through the cognitive virtual assistant. The response from the enrollment server of the one or more third-party benefits providers can contain additional fulfillment material from the third-party benefits provider. The system can relay the additional fulfillment material to the user by various methods of communication, at the user's preference. The received policy or plan information can be presented to the user by the cognitive virtual assistant.

In step 33, the system collects information from the internet online advertising platform and the cognitive virtual assistant for analytics and optimization. The information can also be collected during one or more previously described steps of method 10. The collected information from the cognitive virtual assistant can include for example gender, age, household income, parental status, location, time of day, day of week and premium paid by the user. The collected information from the advertising platform can include the search phrase originally keyed in by the user, and metadata including for example, referring website URL, ad clicked, geolocation, and internet protocol (IP) address.

In step 34, collected information is returned to the online advertising platform for updating optimization. In one embodiment, the optimization includes optimizing ad position for each unique search query to increase or decrease a max cost-per-click (CPC) based upon demographics of the consumer, such as for example gender, age, household income, parental status, and location along with environmental factors, such as for example time of day and day of week.

In one embodiment, the collected information includes tracking user clicks using the online advertising platform. The optimization uses information of whether the consumer chooses to click through an ad listing of the advertiser to generate a click tracking identification (ID) by the online advertising platform which is unique to the consumer's click. The click tracking ID can be linked back to the consumer whether they choose to complete a benefits product application online or call in from the website and complete an application over the phone using the cognitive virtual assistant.

The process of optimization can use an API from a customer relationship management (CRM) of an application of the benefits provider to deliver a status of the application back to the online advertising platform using a status tracking identification (ID) generated by the online advertising platform.

Figure 2:
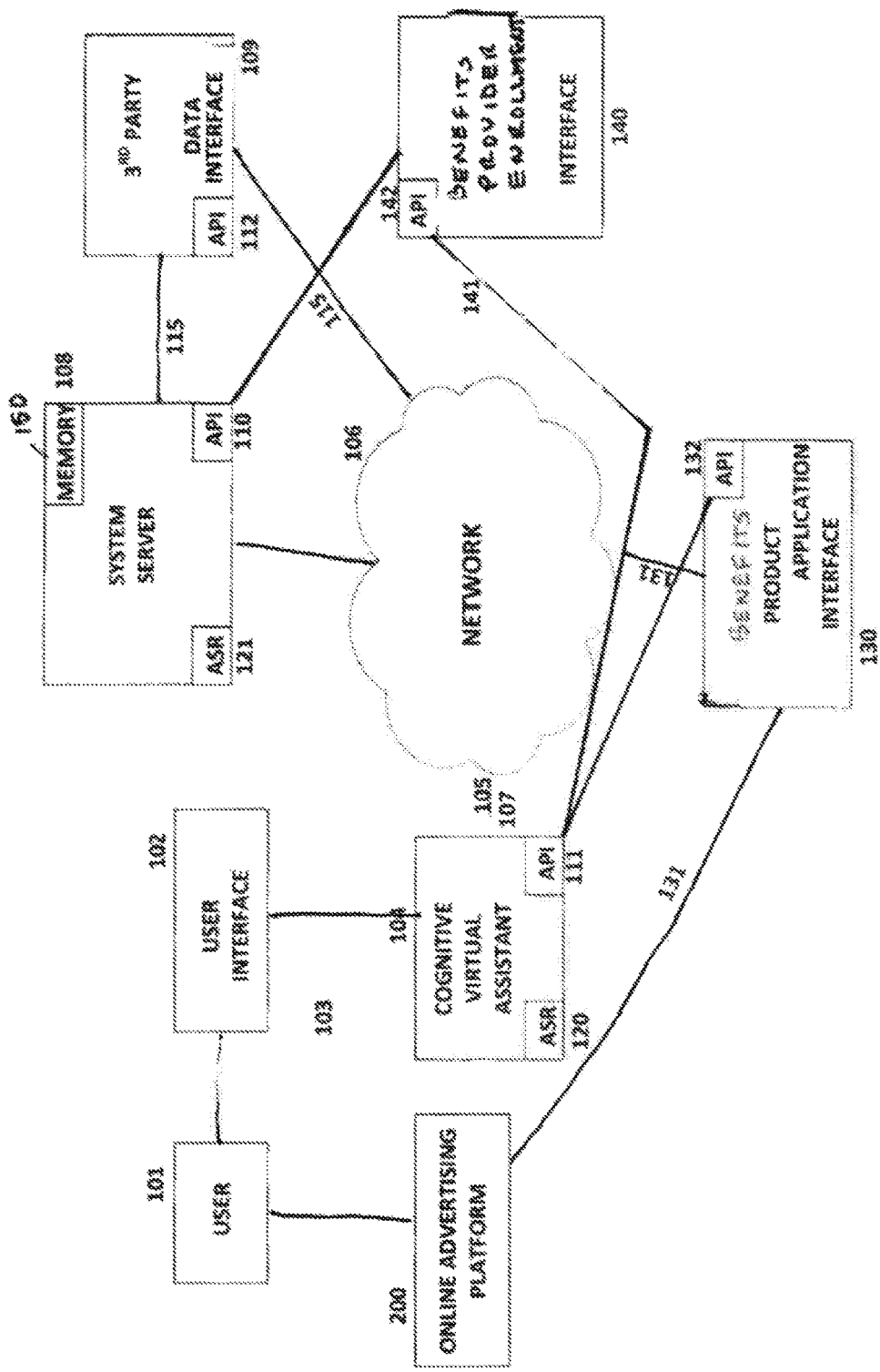
FIG. 2 is a block diagram of an embodiment of an artificial intelligence-based multi-channel system of the present invention.

FIG. 2 is a schematic diagram of an implementation of system 100. System 100 communicates with online advertising platform 200. Online advertising platform receives search terms from user 101 and communicates information to user 101. In one embodiment, online advertising platform 200 communicates a link to cognitive virtual assistant 104.

System 100 includes user interface 102 which is accessed by user 101. User interface 102 can be an electronic device such as a mobile telephony device including for example a mobile device, cell phone or smartphone. User interface 102 can include SMS, chat, mobile app, or Messenger. Mobile telephony devices can communicate with fourth generation (4G) or fifth generation (5G) cellular communications. It will be appreciated that other mobile telephony devices and networks can be used in accordance with the teachings of the present invention. User interface 102 communicates audio or digital information to cognitive virtual assistant 104 over communication path 103.

Cognitive virtual assistant 104 can be a component which is artificial intelligence based. In one embodiment, cognitive virtual assistant receives audio over communication path 103. Audio can be digitized or interpreted by cognitive virtual assistant 104 into data 105. In one embodiment automated speech recognition (ASR) 120 can be performed at cognitive virtual assistant 104 or automated speech recognition (ASR) 121 can be performed at system server 108 to digitally convert received audible speech into transcribed text. Cognitive virtual assistant 104 can utilize commercial technologies including for example sentiment analysis, tone analyzer and personality insights to analyze data and adjust parameters. Cognitive virtual assistant 104 can be implemented in a natural language conversational manner for receiving information from user 101 and automatically generating responses to user 101 during the conversation. Cognitive virtual assistant 104 can have cognitive learning abilities. Cognitive virtual assistant 104 can include natural language processing and context switching. Cognitive virtual assistant 104 can include semantic memory, episodic memory for learning from past conversations, analytic memory for understanding trend of data, affective memory for understanding emotion and deep back projection networks (DBPN) for learning process flows via empirical learning. In some embodiments, the part of speech of content of the utterance of cognitive virtual assistant 104 is determined based on using a natural language parser (e.g., Stanford Natural Language Processing Group software or others as are known in the art) to parse the utterance. The part of speech of content of the utterance can indicate if the content is a noun phrase, verb phrase, and/or theme. In some embodiments, the type of speech of content of the utterance of cognitive virtual assistant 104 is determined based on using a natural language parser (e.g., Stanford Natural Language Processing Group software or others as are known in the art) to parse the utterance. Virtual assistant 104 using artificial intelligence techniques can employ one of numerous methodologies for learning from data and then drawing inferences and/or making determinations related to dynamically storing information across multiple storage units (e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein. The type of speech of content of the utterance can indicate if the content is a noun phrase, verb phrase, and/or theme. In some embodiments, the domain of the content of the utterance of cognitive virtual assistant 104 is determined based on pattern matching. Cognitive virtual assistant 104 can include components such as a processor, memory, storage, microphone, learning module, and operating system. An example, cognitive virtual assistant or virtual producer is described in U.S. Pat. No. 9,812,151 hereby incorporated by reference into this application.

Data 105 is transferred over communication path 107 to network 106. Network 106 communicates with system server 108. For example, network 106 can be the Internet. Cognitive virtual assistant 104 may include a server, computer, laptop, PC, mobile device, or the like that includes a processor, a memory, and a communication device. Cognitive virtual assistant 104 and system server 108 may include a plurality of computing devices connected together, e.g., via a network. The processor may include any general purpose or application-specific processor. The memory may include one or more tangible, non-transitory, machine-readable media.

System server 108 accesses third-party data interface 109. For example, third-party data interface 109 can be an interface to a third-party system for accessing third-party rate quote data. For example, system server 108 can access third-party data 115 directly from databases of third-party benefits providers. In one embodiment, API 110 of system server 108 or API 111 of cognitive virtual assistant 104 communicates with API 112 of third-party data interface 109 to access the features or data from third-party data interface 109. Alternatively, system server 108 can access third-party data 115 over network 106. For example, third-party data 115 can include third-party rate quoting services of a benefits provider and specific underwriting guidelines and requirements.

System server 108 or cognitive virtual assistant 104 can connect to benefits product application interfaces 130. For example, the benefits product application interface 130 can be an interface to one or more third-party systems of benefits providers for accessing data 131. Data 131 can be application requirements data. In one embodiment, API 110 of system server 108 or API 111 of cognitive virtual assistant 104 communicates with API 132 of benefits product application interface 130 to access features of benefits products or data 131 from benefits products application interface 130. Alternatively, system server 108 can access data 131 over network 106. For example, data 131 can include application requirements data fields of an application relating to user information.

System server 108 or cognitive virtual assistant 104 can connect to benefits provider enrollment interface 140. For example, benefits provider enrollment interface 140 can be an interface to one or more third-party systems for accessing enrollment data 141. In one embodiment, API 110 of system server 108 or API 111 of cognitive virtual assistant 104 communicates with API 142 of benefits provider enrollment interface 140 to access the features or data from of benefits provider enrollment interface 140. Alternatively, system server 108 can access enrollment data 141 over network 106. For example, enrollment data 131 can include policy and plan identification data and fulfillment data. In one embodiment, benefits provider enrollment interface 140 can send enrollment data 131 directly to user 101 through user interface 102 by a chosen method of communication. Data 105, third-party data 115, 131 and enrollment data 141 can be stored in memory 150 of system server 108.

Information collected from cognitive virtual assistant 104 can be forwarded from API 111 to online advertising platform 200 for analytics and optimization. Enrollment data 131 can be forwarded from API 132 to online advertising platform 200. In one embodiment, API 110, API 111, API 112, API 132 and API 142 are web based APIs.

Embodiments of the present invention can be implemented in connection with a special purpose or general purpose computer device that includes both hardware and/or software components, including special purpose or general purpose computers.

Embodiments can also include physical computer-readable media and/or intangible computer-readable media for carrying or having computer-executable instructions, data structures, and/or data signals stored thereon. Such physical computer-readable media and/or intangible computer-readable media can be any available media that can be accessed by a general purpose or special purpose computer. By way of example, and not limitation, such physical computer-readable media can include RAM, ROM, EEPROM, CD-ROM or other optical disk storage, magnetic disk storage or other magnetic storage devices, other semiconductor storage media, or any other physical medium which can be used to store desired data in the form of computer-executable instructions, data structures and/or data signals, and which can be accessed by a general purpose or special purpose computer. Within a general purpose or special purpose computer, intangible computer-readable media can include electromagnetic means for conveying a data signal from one part of the computer to another, such as through circuitry residing in the computer.

When information is transferred or provided over a network or another communications connection (either hardwired, wireless, or a combination of hardwired or wireless) to a computer, hardwired devices for sending and receiving computer-executable instructions, data structures, and/or data signals (e.g., wires, cables, optical fibers, electronic circuitry, chemical, and the like) should properly be viewed as physical computer-readable mediums while wireless carriers or wireless mediums for sending and/or receiving computer-executable instructions, data structures, and/or data signals (e.g., radio communications, satellite communications, infrared communications, and the like) should properly be viewed as intangible computer-readable mediums. Combinations of the above should also be included within the scope of computer-readable media.

Computer-executable instructions include, for example, instructions, data, and/or data signals which cause a general purpose computer, special purpose computer, or special purpose processing device to perform a certain function or group of functions. Although not required, aspects of the invention have been described herein in the general context of computer-executable instructions, such as program modules, being executed by computers, in network environments and/or non-network environments. Generally, program modules include routines, programs, objects, components, and content structures that perform particular tasks or implement particular abstract content types. Computer-executable instructions, associated content structures, and program modules represent examples of program code for executing aspects of the methods disclosed herein.

While the subject matter has been described above in the general context of computer-executable instructions of a program that runs on one or more computers, those skilled in the art will recognize that the subject matter described herein also can be implemented in combination with other program modules. Generally, program modules include routines, programs, components, data structures, etc. that perform particular tasks and/or implement particular abstract data types. Moreover, those skilled in the art will appreciate that the inventive methods can be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects can also be practiced in distributed computing environments where tasks are performed by remote processing devices that are linked through a communications network. However, some, if not all aspects of the claimed subject matter can be practiced on stand-alone computers. In a distributed computing environment, program modules can be located in both local and remote memory storage devices.

Embodiments may also include computer program products for use in the systems of the present invention, the computer program product having a physical computer-readable medium having computer readable program code stored thereon, the computer readable program code comprising computer executable instructions that, when executed by a processor, cause the system to perform the methods of the present invention.

It is to be understood that the above described embodiments are illustrative of only a few of the many possible specific embodiments, which can represent applications of the principles of the invention. Numerous and varied other arrangements can be readily devised in accordance with these principles by those skilled in the art without departing from the spirit and scope of the invention.

What is claimed is:

1. A computer-implemented method comprising the steps of:
   a. initiating an interface to a cognitive virtual assistant by matching one or more user search terms entered in an online advertising platform and displaying a link to connect with the cognitive virtual assistant and receiving by the cognitive virtual assistant, audible speech from the user interface during a conversation of a user with the cognitive virtual assistant, digitally converting, by the cognitive virtual assistant, the audible speech into transcribed text, generating data and responses by interpreting the transcribed text with artificial intelligence using cognitive learning abilities at a processor of the computer, forwarding the responses to the user interface during the conversation;
   b. prompting, by the cognitive virtual assistant, the user during the conversation for information and a description of one or more benefits products which are of interest to the user for purchase or enrollment;
   c. receiving, by the cognitive virtual assistant via one or more of a benefits provider application interfaces, data from an application server of one or more benefits providers for the one or more benefits products;
   d. identifying, by the cognitive virtual assistant, eligibility of the user for purchase or enrollment in the one or more benefits products which are of interest by the user based on eligibility determined from the data collected from the user by the cognitive virtual assistant during the conversation and the data collected from the one or more benefits provider application interfaces
   e. presenting, by the cognitive virtual assistant, the one or more benefits products identified in step d. to the user during the conversation;
   f. completing, by the cognitive virtual assistant, application requirements of the one or more benefits products; and
   g. communicating, by the cognitive virtual assistant, the application requirements to a respective one or more benefits providers.

2. The method of claim 1 wherein the step of prompting, by the cognitive virtual assistant, a user for information includes prompting the user to answer one or more pre-qualifying questions and eligibility of the user for purchase or enrollment in the one or more benefits products being based on answers to the one or more pre-qualifying questions.

3. The method of claim 1 further comprising adjusting parameters of the virtual assistant to accommodate the user.

4. The method of claim 1 further comprising the step of receiving, by the cognitive virtual assistant, enrolled policy information after enrollment and presenting, by the cognitive virtual assistant, the enrolled policy.

5. The method of claim 1 wherein the user interface to the cognitive virtual assistant is via audio, phone, mobile device, tablet, app, SMS, chat, videoconference, or virtual reality.

6. The method of claim 1 further comprising the steps of collecting information, by the cognitive virtual assistant, from the online advertising platform and the cognitive virtual assistant during one or more of steps a. through f and returning the collected information to the online advertising platform.

7. The method of claim 6 further comprising the step of improving the online advertising platform by improving ad position for each unique search query of the one or more search terms entered in the online advertising platform to increase or decrease a max cost-per click (CPC) based upon demographics of the user determined by using the collected information from the online advertising platform.

8. The method of claim 7 wherein the collected information from the online advertising platform includes tracking user click information using the online advertising platform and the step of improving the online advertising platform uses the tracking user click information to generate a click tracking identification (ID) by the online advertising platform during step a. and the click tracking identification (ID) being used during steps b. through f.

9. The method of claim 7 wherein step of improving the online advertising platform provides a status of the step of completing application requirements of the identified one or more relevant benefits products to the online advertising platform.

\* \* \* \* \*